(12) United States Patent
Tu et al.

(10) Patent No.: US 12,098,668 B2
(45) Date of Patent: Sep. 24, 2024

(54) DPF REGENERATION TRIGGER CONTROL METHOD AND TERMINAL DEVICE, AND STORAGE MEDIUM

(71) Applicant: Xiamen Yaxon Network Co., Ltd., Fujian (CN)

(72) Inventors: Yankai Tu, Fujian (CN); Yuan Chen, Fujian (CN)

(73) Assignee: Xiamen Yaxon Network Co., Ltd., Fujian (CN)

( * ) Notice: Subject to any disclaimer, the term of this patent is extended or adjusted under 35 U.S.C. 154(b) by 0 days.

(21) Appl. No.: 18/015,424

(22) PCT Filed: Aug. 18, 2020

(86) PCT No.: PCT/CN2020/109705
§ 371 (c)(1),
(2) Date: Jan. 10, 2023

(87) PCT Pub. No.: WO2022/007111
PCT Pub. Date: Jan. 13, 2022

(65) Prior Publication Data
US 2023/0323803 A1    Oct. 12, 2023

(30) Foreign Application Priority Data

Jul. 10, 2020  (CN) .......................... 202010661747.7

(51) Int. Cl.
| | | |
|---|---|---|
| F01N 9/00 | (2006.01) | |
| F01N 3/023 | (2006.01) | |
| F01N 11/00 | (2006.01) | |

(52) U.S. Cl.
CPC ............. *F01N 9/002* (2013.01); *F01N 3/023* (2013.01); *F01N 11/005* (2013.01);
(Continued)

(58) Field of Classification Search
CPC .. F01N 9/002; F01N 11/005; F01N 2900/102; F01N 2900/12; F01N 2900/1404; F01N 2900/1606
See application file for complete search history.

(56) References Cited

U.S. PATENT DOCUMENTS

| | | | | |
|---|---|---|---|---|
| 2011/0094210 A1* | 4/2011 | Suzuki | .................. | F02D 41/029 60/295 |
| 2012/0180463 A1* | 7/2012 | Oohashi | ................. | B01D 46/42 60/297 |

(Continued)

FOREIGN PATENT DOCUMENTS

| | | |
|---|---|---|
| CN | 102042059 A | 5/2011 |
| CN | 102713177 A | 10/2012 |

(Continued)

OTHER PUBLICATIONS

International Search Report cited in PCT/CN2020/109705 mailed Apr. 9, 2021, 6 pages.

(Continued)

*Primary Examiner* — Matthew T Largi
(74) *Attorney, Agent, or Firm* — Cooper Legal Group, LLC

(57) ABSTRACT

The disclosure relates to a DPF regeneration trigger control method and terminal device, and a storage medium. The method includes: setting an active trigger differential pressure and an initial trigger differential pressure; and controlling, according to a relationship between a differential pressure of the DPF collected in real time during a vehicle travelling process and the active trigger differential pressure and a relationship between the differential pressure of the DPF and the initial trigger differential pressure, the vehicle to actively start DPF regeneration, to trigger passive DPF regeneration, or not to start DPF regeneration; otherwise, controlling the vehicle to actively start DPF regeneration.

(Continued)

According to the disclosure, by setting a flexible trigger interval, there is a tolerance interval of differential pressure, so that fuel consumption of the diesel engine can be reduced, and the economy is improved.

11 Claims, 3 Drawing Sheets

(52) U.S. Cl.
CPC .... *F01N 2900/102* (2013.01); *F01N 2900/12* (2013.01); *F01N 2900/1404* (2013.01); *F01N 2900/1606* (2013.01)

(56) References Cited

U.S. PATENT DOCUMENTS

| | | | |
|---|---|---|---|
| 2013/0125529 A1* | 5/2013 | Ardanese | F01N 9/002 60/274 |
| 2015/0033943 A1* | 2/2015 | Bevan | F01N 3/0253 96/420 |
| 2017/0235310 A1* | 8/2017 | Miyake | G05D 1/0212 701/25 |
| 2018/0340784 A1* | 11/2018 | Upadhyay | F01N 9/007 |
| 2018/0340785 A1* | 11/2018 | Upadhyay | F01N 9/002 |

FOREIGN PATENT DOCUMENTS

| | | | | |
|---|---|---|---|---|
| CN | 109356698 | A | 2/2019 | |
| CN | 110295982 | A | 10/2019 | |
| CN | 110925065 | A | 3/2020 | |
| DE | 102015204042 | A1 * | 9/2016 | ............. F02D 19/08 |

OTHER PUBLICATIONS

Written Opinion cited in PCT/CN2020/109705 mailed Apr. 9, 2021, 7 pages.

* cited by examiner

DPF REGENERATION TRIGGER CONTROL METHOD AND TERMINAL DEVICE, AND STORAGE MEDIUM

TECHNICAL FIELD

The present invention relates to the field of intelligent control of vehicles, and in particular to a DPF regeneration trigger control method and terminal device, and a storage medium.

BACKGROUND

A diesel particulate filter (DPF) is a filter mounted in a diesel engine exhaust system. The DPF can capture particulate emissions before they enter the atmosphere, reducing soot pollution of exhaust gases. With the increase of service time, the particulate matter attached to DPF filter increases, which leads to an increase in exhaust resistance of the diesel engine. At this time, it is necessary to take a series of measures to burn off (oxidize) the particulate, that is, to perform DPF regeneration.

Generally, DPF regeneration is to burn (oxidize) the particulate matter by using the high temperature of the exhaust gas. According to the DPF regeneration requirement, only when the temperature of the exhaust gas is 500 to 650° C., can the particulate matter be burned off (oxidized). According to an exhaust isothermal curve of the diesel engine, it can be known that the exhaust temperature is the highest under full load conditions, reaching 600° C. or above. Therefore, under high load conditions, the diesel engine can naturally achieve the DPF regeneration condition, which can also be called "passive DPF regeneration". However, when the vehicle runs at a low load, the exhaust temperature of the diesel engine is basically below 400° C. At this time, in order to increase the exhaust temperature, it is necessary to actively take auxiliary measures inside the diesel engine, such as secondary injection and delay of primary injection, to burn additional diesel, thereby increasing the exhaust temperature and actively ensuring DPF regeneration, which can also be called "actively start DPF regeneration". However, the use of this "actively start DPF regeneration" mode will inevitably lead to a waste of diesel.

SUMMARY

In order to solve the above problems, the present invention provides a DPF regeneration trigger control method and terminal device, and a storage medium.

The specific solutions are as follows:

Provided is a DPF regeneration trigger control method, including:

setting an active trigger differential pressure and an initial trigger differential pressure, where the initial trigger differential pressure is less than the active trigger differential pressure; and collecting a differential pressure of the DPF in real time during a vehicle travelling process, and performing the following determination and control:

if the differential pressure is greater than the active trigger differential pressure, controlling the vehicle to actively start DPF regeneration; otherwise, if the differential pressure is greater than the initial trigger differential pressure, determining whether an exhaust temperature of an engine reaches a passive DPF regeneration required temperature, and if so, triggering passive DPF regeneration; otherwise, predicting, according to a gradient of a road ahead, a probability of starting DPF regeneration within a predicted distance ahead of a current position of the vehicle, and if the probability is greater than a probability threshold, controlling the vehicle not to start DPF regeneration; otherwise, controlling the vehicle to actively start DPF regeneration.

Further, a method of setting the predicted distance includes: predicting, according to an increase of the differential pressure of the vehicle with time collected before a current moment, a predicted time to be experienced from the initial trigger differential pressure to the active trigger differential pressure, and using a product of the predicted time and a current speed of vehicle as the predicted distance.

Further, a method of predicting the probability of starting DPF regeneration within the predicted distance ahead of the current position includes: selecting, based on gradient values of all positions within the predicted distance ahead of the current position of the vehicle, all positions having a gradient value greater than that of the current position, and using a maximum value in the probabilities of starting DPF regeneration corresponding to all the positions having the gradient value greater than that of the current position as the probability of starting DPF regeneration within the predicted distance ahead of the current position of the vehicle.

Further, a method for calculating the probability of starting DPF regeneration corresponding to each position includes: calculating, based on a gradient value of a certain position and an exhaust isothermal curve and a rotational speed range of the engine, an exhaust temperature range corresponding to the position; and calculating, based on an exhaust temperature range corresponding to the position and a passive DPF regeneration required temperature range, the probability of starting DPF regeneration corresponding to the position.

Further, a method for calculating the exhaust temperature range corresponding to each position includes: calculating, based on a gradient value of a certain position, an engine load range corresponding to the position; calculating, based on the engine load range corresponding to the position, an engine power range corresponding to the position; calculating, based on the engine power range corresponding to the position, an internal mean effective pressure range corresponding to the position when the engine outputs power within the power range; and calculating, based on the exhaust isothermal curve of the engine, the internal mean effective pressure range corresponding to the position and the rotational speed range of the engine, the exhaust temperature range corresponding to the position.

Further, a calculation formula of the engine load range corresponding to each position is:

$$N' \in [N+mgV(Q_i-Q_0)(1-10\%)/W_{max}, N+mgV(Q_i-Q_0)(1+10\%)/W_{max}]$$

where N' represents the engine load range, N represents an engine load of the vehicle at the current moment, m represents a mass of the vehicle, g represents the gravity acceleration, V represents the speed of vehicle at the current moment, $Q_i$ represents a gradient value of an i-th position, $Q_0$ represents a gradient value of the position of the vehicle at the current moment, and $W_{max}$ represents a maximum output power of the engine.

Further, the power range of the vehicle corresponding to each position is a product of the engine load range corresponding to the position and the maximum output power of the engine.

Further, a calculation formula of the internal mean effective pressure range $W_m$ corresponding to each position is:

$$W_m = \frac{30 * \tau * W_p}{V_s * a * n}$$

where a represents the number of cylinders of the engine, $V_s$ represents a cylinder volume, n represents the rotational speed range of the engine, $\tau$ represents the number of strokes of the engine, and $W_p$ represents the engine power range corresponding to the position.

Further, the probability of starting DPF regeneration corresponding to each position is a proportion of an intersection of the exhaust temperature range corresponding to the position and the passive DPF regeneration required temperature range.

Further, the gradient of the road ahead is obtained from electronic horizon information ahead.

Provided is a DPF regeneration trigger control terminal device, including a processor, a memory, and a computer program stored in the memory and running in the processor. The processor, when executing the computer program, implements the steps in the method in the embodiments of the present invention.

Provided is a computer-readable storage medium having a computer program stored thereon. The computer program, when executed by a processor, implements the steps in the method in the embodiments of the present invention.

According to the technical solutions of the present invention, after the original DPF trigger differential pressure, a flexible trigger interval and an active trigger differential pressure are defined within an allowable interval. Within the flexible trigger interval, although DPF regeneration is required, there is a tolerance interval. Within this tolerance interval of differential pressure, even if DPF regeneration is not started, the exhaust device will not be physically damaged or blocked, causing the exhaust device fail to operate. After the differential pressure reaches the active trigger differential pressure, the DPF regeneration should be started regardless of external conditions, otherwise the exhaust pipe will be blocked or burned out. In this way, the fuel consumption of the diesel engine can be reduced, and the economy is improved.

DESCRIPTION OF EMBODIMENTS

To further illustrate the embodiments, the accompanying drawings are provided in the present invention. These accompanying drawings are a part of the contents disclosed in the present invention that are mainly used to illustrate the embodiments, and can be used in conjunction with the related descriptions in the specification to explain the operation principle of the embodiments. With reference to these contents, those skilled in the art will be able to understand other possible implementations and advantages of the present invention.

The present invention will be further described in conjunction with the accompanying drawings and the specific implementations.

Embodiment I

Figure 1:
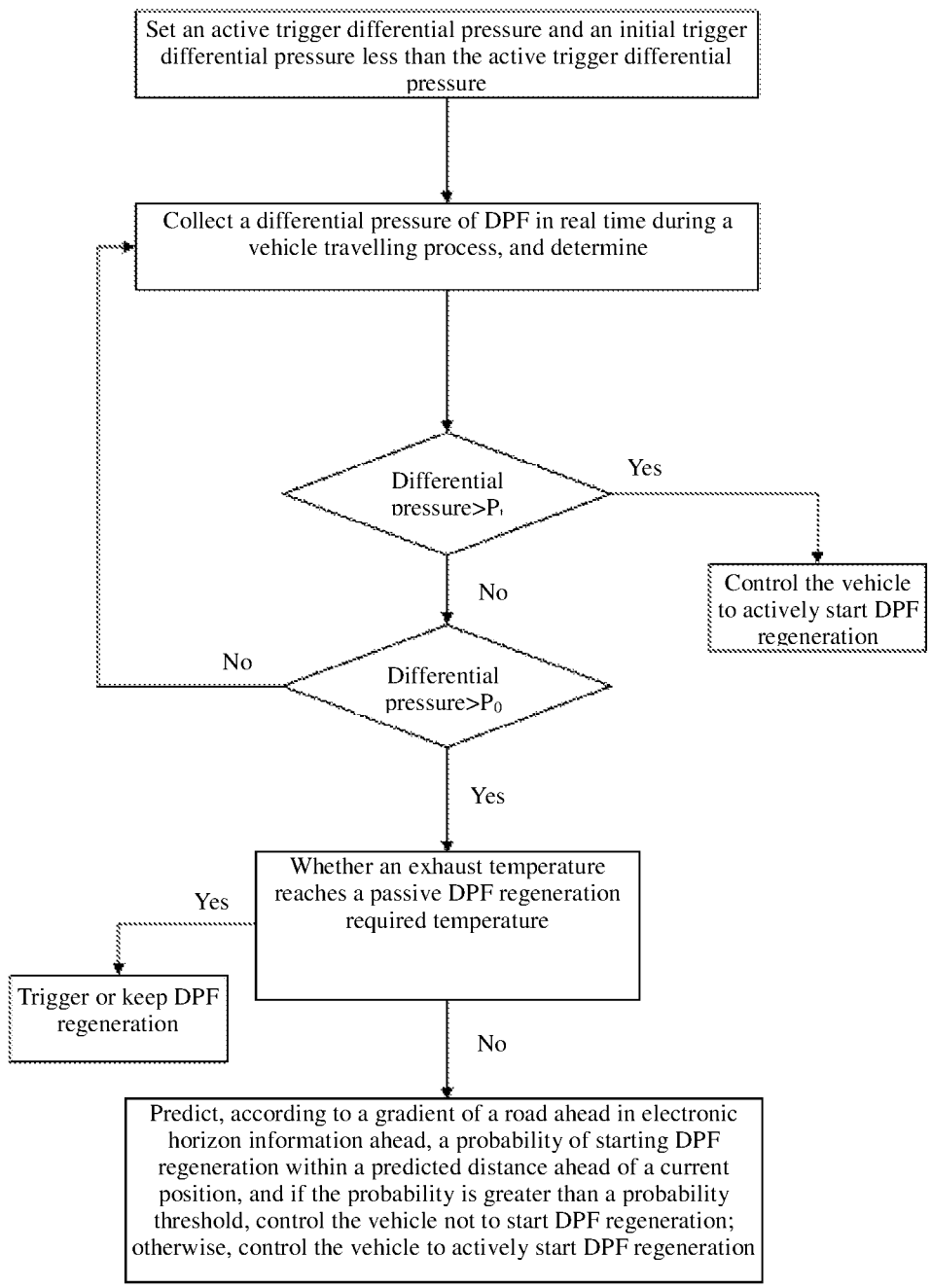
FIG. 1 shows a flowchart of Embodiment I of the present invention.

This embodiment of the present invention provides a DPF regeneration trigger control method. As shown in FIG. 1, the method includes the following steps:

S1: Set an active trigger differential pressure $P_t$ and an initial trigger differential pressure $P_0$, where the initial trigger differential pressure $P_0$ is less than the active trigger differential pressure $P_t$.

The differential pressure of the DPF is a difference in pressure of the exhaust gas before and after the DPF. The larger the differential pressure, the more serious the particulate accumulation in the DPF.

Figure 2:
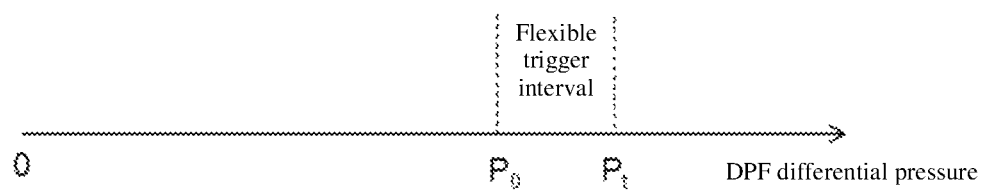
FIG. 2 is a schematic diagram of an initial trigger differential pressure and an active trigger differential pressure in this embodiment.

The active trigger differential pressure is a differential pressure set by increasing a certain value relative to the initial trigger differential pressure. The magnitudes of the two differential pressures can be set by those skilled in the art according to experience and experimental results. As shown in FIG. 2, $P_0$ is the initial trigger differential pressure, and $P_t$ is the active trigger differential pressure. By setting the initial trigger differential pressure, a flexible trigger interval $[P_0, P_t)$ is defined. Within this flexible trigger interval, the engine load can be predicted in advance according to the electronic horizon information ahead, thereby realizing flexible trigger, and reducing the fuel consumption caused by active regeneration.

S2: Collect the differential pressure of the DPF in real time during a vehicle travelling process, and perform the following determination: if the differential pressure is greater than the active trigger differential pressure $P_t$, control the vehicle to actively start DPF regeneration; otherwise, if the differential pressure is less than or equal to the active trigger differential pressure $P_t$ and greater than the initial trigger differential pressure $P_0$, proceed to S3.

S3: Collect an exhaust temperature of the engine corresponding to the current moment, and determine whether the exhaust temperature of the engine reaches a passive DPF regeneration required temperature, and if so, trigger passive DPF regeneration or keep DPF regeneration; otherwise, proceed to S4.

Typically, the passive DPF regeneration required temperature range is 500 to 650° C., which can be set by those skilled in the art according to actual conditions of the vehicle.

S4: Predict, according to a gradient of a road ahead in the electronic horizon information ahead, a probability of starting DPF regeneration within a predicted distance ahead of a current position, and if the probability is greater than a probability threshold, control the vehicle not to start DPF regeneration; otherwise, control the vehicle to actively start DPF regeneration.

In this embodiment, a method of setting the predicted distance includes: predicting, according to an increase of the differential pressure of the vehicle with time collected before the current moment, a predicted time T to be experienced from the initial trigger differential pressure $P_0$ to the active trigger differential pressure $P_t$, and using a product of the predicted time T and a current speed of vehicle V as the predicted distance.

The load of the engine increases only when the gradient ahead is greater than the current gradient. Therefore, in this embodiment, only the probability of starting DPF regeneration at the position having a gradient value greater than that of the current position within the predicted distance ahead of the current position is considered. Specifically, based on gradient values of all positions within the predicted distance ahead of the current position, all positions having a gradient value greater than that of the current position are selected, and a maximum value in the probabilities of starting DPF regeneration corresponding to all the selected positions having the gradient value greater than that of the current position is used as the probability of starting DPF regeneration within the predicted distance ahead of the current position.

A method for calculating the probability of starting DPF regeneration corresponding to each position includes: calculating, based on a gradient value of a certain position and an exhaust isothermal curve and a rotational speed range of the engine, an exhaust temperature range corresponding to the position; and calculating, based on an exhaust temperature range corresponding to the position and a passive DPF regeneration required temperature range, the probability of starting DPF regeneration corresponding to the position.

Figure 4:
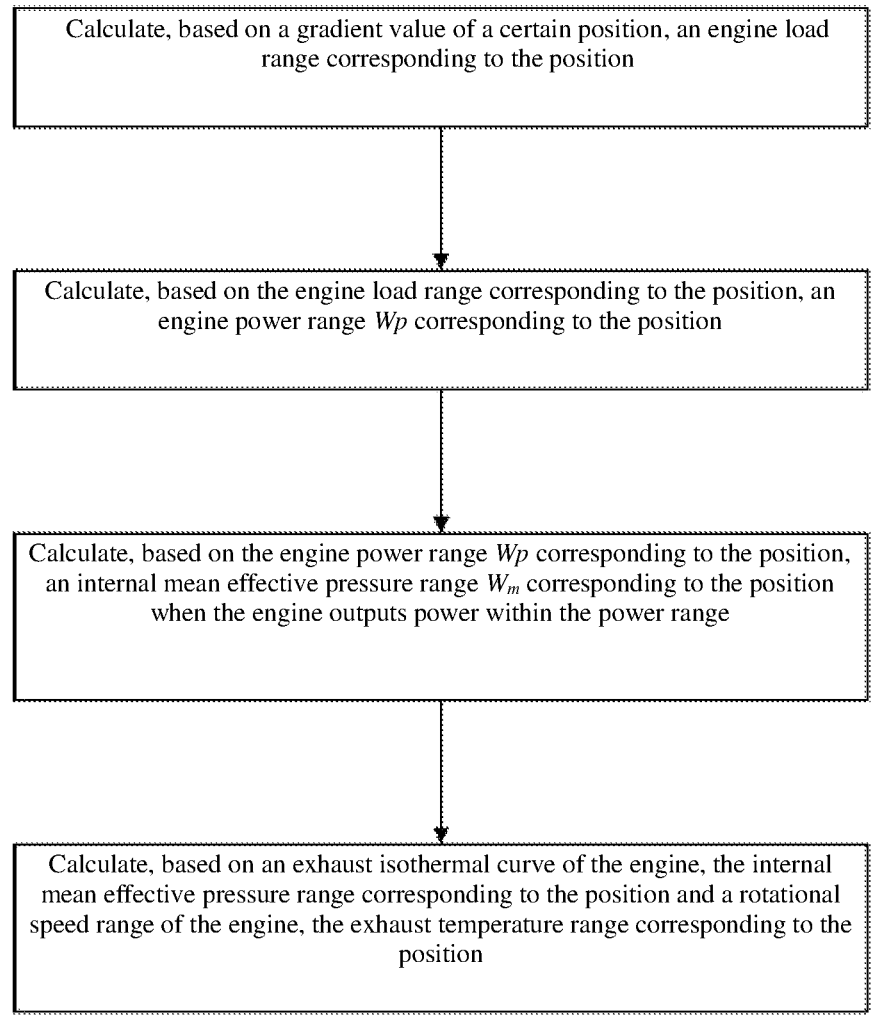
FIG. 4 is a flowchart of a method of calculating an exhaust temperature range corresponding to each position in this embodiment.

As shown in FIG. 4, a process of calculating the exhaust temperature range corresponding to each position includes the following steps:

S41: Calculate, based on a gradient value of a certain position, an engine load range corresponding to the position. The specific calculation formula is:

$$N' \in [N+mgV(Q_i-Q_0)(1-10\%)/W_{max}, N+mgV(Q_i-Q_0)(1+10\%)/W_{max}]$$

where N' represents the engine load range, N represents an engine load of the vehicle at the current moment, m represents a mass of the vehicle, g represents the gravity acceleration, V represents the speed of vehicle at the current moment, $Q_i$ represents a gradient value of an i-th position, $Q_0$ represents a gradient value of the position of the vehicle at the current moment, and $W_{max}$ represents a maximum output power of the engine.

S42: Calculate, based on the engine load range corresponding to the position, an engine power range Wp corresponding to the position:

$$Wp=N'*W_{max}$$

S43: Calculate, based on the engine power range Wp corresponding to the position, an internal mean effective pressure range $W_m$ corresponding to the position when the engine outputs power within the power range:

$$W_m = \frac{30*\tau*W_p}{V_s*a*n}$$

where a represents the number of cylinders of the engine, $V_s$ represents a cylinder volume, n represents the rotational speed range of the engine, which is calculated by multiplying a range of predicted speed of vehicle [V(1−10%), V(1+10%)] by a gear ratio of the vehicle, and represents the number of strokes of the engine, S44: Calculate, based on the exhaust isothermal curve of the engine, the internal mean effective pressure range corresponding to the position and the rotational speed range of the engine, the exhaust temperature range corresponding to the position.

Figure 3:
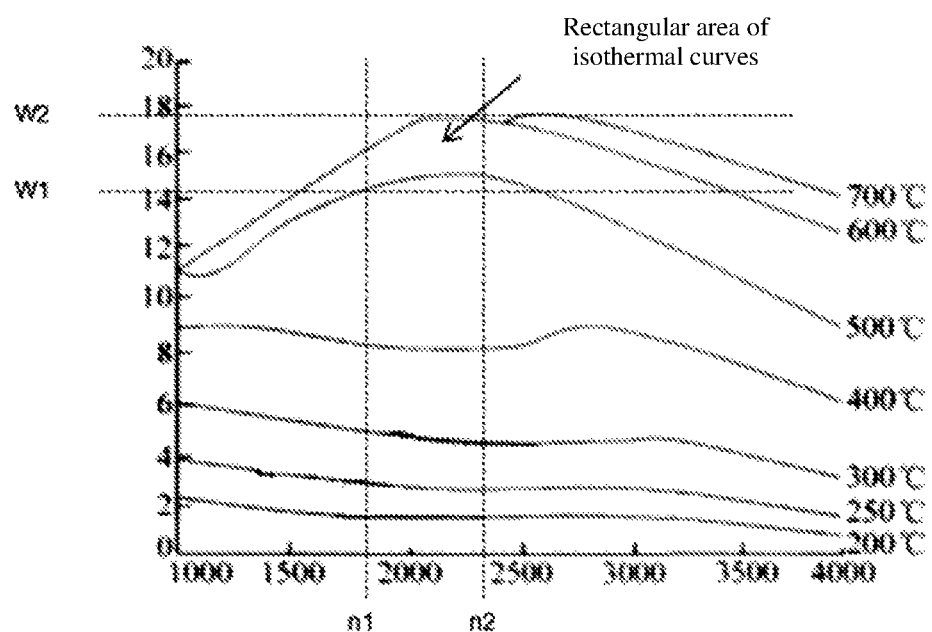
FIG. 3 is an exhaust isothermal curve graph of the engine in this embodiment.

The exhaust isothermal curve of the engine is shown in FIG. 3, where the abscissa represents the rotational speed, and the ordinate represents the internal mean effective pressure of the engine. Then, according to the internal mean effective pressure range [$W_1$, $W_2$] corresponding to the position and the rotational speed range [$n_1$, $n_2$] of the engine, a rectangular area can be defined. The minimum isothermal curve value $T_1$ and the maximum isothermal curve value $T_2$ included in this rectangular area are found out to define the predicted exhaust temperature range [$T_1$, $T_2$].

The probability of starting DPF regeneration corresponding to each position is a proportion D of an intersection of the exhaust temperature range corresponding to the position and the passive DPF regeneration required temperature range. The specific calculation formula is:

$$D = \frac{[T_1, T_2] \cap [T_{min}, T_{max}]}{T_{max} - T_{min}}$$

where $T_{max}$ represents the maximum value in the passive DPF regeneration required temperature range, and $T_{min}$ represents the minimum value in the passive DPF regeneration required temperature range.

According to Embodiment I of the present invention, after the original DPF trigger differential pressure (i.e., within a wider interval of differential pressure), a flexible trigger interval and an active trigger differential pressure are defined within an allowable interval. Within the flexible trigger interval, although DPF regeneration is required, there is a tolerance interval. Within this tolerance interval of differential pressure, even if DPF regeneration is not started, the exhaust device will not be physically damaged or blocked, causing the exhaust device fail to operate. After the differential pressure reaches the active trigger differential pressure, the DPF regeneration should be started regardless of external conditions, otherwise the exhaust pipe will be blocked or burned out. In this way, the fuel consumption of the diesel engine can be reduced, and the economy is improved.

Embodiment II

The present invention further provides a DPF regeneration trigger control terminal device, including a memory, a processor, and a computer program stored in the memory and capable of running in the processor. The processor, when executing the computer program, implements the steps in the method embodiment in Embodiment I of the present invention.

Further, as a feasible implementation, the DPF regeneration trigger control terminal device may be an on-board computer, a cloud server or other computing devices. In an implementation of the on-board computer, the on-board computer is connected to various on-board devices (such as the diesel particulate filter (DPF), a vehicle speed sensor, etc.) through CAN buses, Ethernet or other buses in the vehicle, so as to acquire electronic horizon data ahead, vehicle travelling speed and differential pressure of DPF that are required for operation of the on-board computer and to control the DPF. The DPF regeneration trigger control terminal device may include, but not limited to, a processor and a memory. It can be understood by those skilled in the art that the composition of the DPF regeneration trigger control terminal device is merely an example of the DPF regeneration trigger control terminal device, and does not constitute a limitation to the DPF regeneration trigger control terminal device. The DPF regeneration trigger control terminal device may include more or less components than the above, or a combination of some components, or different components. For example, the DPF regeneration trigger control terminal device may further include input-output devices, network access devices, buses, etc., which is not limited by the embodiment of the present invention.

Further, as a feasible implementation, the processor may be a central processing unit (CPU), other general-purpose processors, a digital signal processor (DSP), an application specific integrated circuit (ASIC), a field-programmable gate array (FPGA) or other programmable logic devices, a discrete gate or transistor logic device, a discrete hardware component, etc. The general-purpose processor may be a microprocessor, or the processor may also be any conventional processor, etc. The processor is the control center of the DPF regeneration trigger control terminal device, and connects all parts of the entire DPF regeneration trigger control terminal device using various interfaces and lines.

The memory can be used for storing the computer program and/or module. The processor implements various functions of the DPF regeneration trigger control terminal device by running or executing the computer program and/or module stored in the memory and calling the data stored in the memory. The memory may mainly include a program storage area and a data storage area. The program storage area may store an operating system and application programs required by at least one function. The data storage area may store data created according to the use of a mobile phone, etc. Besides, the memory may include a high-speed random access memory, and may further include a non-volatile memory, such as a hard disk, an internal memory, a plug-in hard disk, a smart media card (SMC), a secure digital (SD) card, a flash card, at least one disk memory device, a flash memory device, or other volatile solid-state memory devices.

The present invention further provides a computer-readable storage medium having a computer program stored thereon. The computer program, when executed by a processor, implements the steps in the method in the embodiments of the present invention.

If an integrated module/unit of the DPF regeneration trigger control terminal device is implemented in the form of a software functional unit and sold or used as an independent product, it can be stored in the computer-readable storage medium. Based on such understanding, the implementation of all or part of the processes in the method of the embodiments of the present invention may also be completed by instructing related hardware by the computer program. The computer program may be stored in a computer-readable storage medium. The computer program, when executed by the processor, can implement the steps in the method embodiments. The computer program includes a computer program code, which may be in the form of a source code, an object code or an executable file, or in some intermediate forms. The computer-readable medium may include: any entity or apparatus capable of carrying the computer program code, a recording medium, a USB flash drive, a removable hard drive, a magnetic disk, an optical disk, a computer memory, a read-only memory (ROM), a random access memory (RAM), a software distribution medium, etc.

Although the present invention has been specifically shown and described in connection with the preferred implementations, it should be understood by those skilled in the art that various changes in form and details can be made without departing from the spirit and scope of the present invention as defined by the appended claims, and shall all fall within the protection scope of the present invention.

The invention claimed is:

1. A diesel particulate filter (DPF) regeneration trigger control method, comprising:
    setting an active trigger differential pressure and an initial trigger differential pressure, wherein the initial trigger differential pressure is less than the active trigger differential pressure; and
    collecting a differential pressure of a DPF in real time during a vehicle travelling process, and performing the following determination and control:
        when the differential pressure is greater than the active trigger differential pressure, controlling the vehicle to actively start DPF regeneration; and
        when the differential pressure is greater than the initial trigger differential pressure but less than or equal to the active trigger differential pressure, determining whether an exhaust temperature of an engine reaches a passive DPF regeneration required temperature, and when the exhaust temperature of the engine reaches the passive DPF regeneration required temperature, triggering the passive DPF regeneration; when the exhaust temperature of the engine does not reach the passive DPF regeneration required temperature, predicting, according to a gradient of a road ahead, a probability of starting the DPF regeneration within a predicted distance ahead of a current position of the vehicle, and when the probability is greater than a probability threshold, controlling the vehicle not to start the DPF regeneration; when the probability is less than or equal to the probability threshold, controlling the vehicle to actively start the DPF regeneration;
    wherein predicting the probability of starting the DPF regeneration within the predicted distance ahead of the current position of the vehicle comprises:
        selecting, based on gradient values of all positions within the predicted distance ahead of the current position, all positions having a gradient value greater than that of the current position; and
        using a maximum value in probabilities of starting the DPF regeneration corresponding to all the positions having the gradient value greater than that of the current position as the probability of starting the DPF regeneration within the predicted distance ahead of the current position of the vehicle.

2. The DPF regeneration trigger control method according to claim 1, wherein setting the predicted distance comprises:
    predicting, according to an increase of the differential pressure of the vehicle with a time collected before a current moment, a predicted time to be experienced from the initial trigger differential pressure to the active trigger differential pressure, and using a product of the predicted time and a current speed of vehicle as the predicted distance.

3. The DPF regeneration trigger control method according to claim 1, wherein calculating the probability of starting DPF regeneration corresponding to each position comprises:
    calculating, based on a gradient value of a certain position and an exhaust isothermal curve and a rotational speed range of the engine, an exhaust temperature range corresponding to the certain position; and
    calculating, based on an exhaust temperature range corresponding to the certain position and a passive DPF regeneration required temperature range, the probability of starting DPF regeneration corresponding to the certain position.

4. The DPF regeneration trigger control method according to claim 3, wherein calculating the exhaust temperature range corresponding to each position comprises:
  calculating, based on the gradient value of the certain position, an engine load range corresponding to the certain position;
  calculating, based on the engine load range corresponding to the certain position, an engine power range corresponding to the certain position;
  calculating, based on the engine power range corresponding to the certain position, an internal mean effective pressure range corresponding to the certain position when the engine outputs power within the engine power range; and
  calculating, based on the exhaust isothermal curve of the engine, the internal mean effective pressure range corresponding to the certain position and the rotational speed range of the engine, the exhaust temperature range corresponding to the certain position.

5. The DPF regeneration trigger control method according to claim 4, wherein a calculation formula of the engine load range corresponding to each position is:

$N' \in [N+mgV(Q_i-Q_0)(1-10\%)/W_{max}, N+mgV(Q_i-Q_0)(1+10\%)/W_{max}]$ wherein N' represents the engine load range, N represents an engine load of vehicle at a current moment, m represents a mass of the vehicle, g represents gravity acceleration, V represents a current speed of vehicle at the current moment, $Q_i$ represents a gradient value of an i-th position, $Q_0$ represents a gradient value of a position of the vehicle at the current moment, and $W_{max}$ represents a maximum output power of the engine.

6. The DPF regeneration trigger control method according to claim 4, wherein the engine power range of the vehicle corresponding to each position is a product of the engine load range corresponding to the certain position and a maximum output power of the engine.

7. The DPF regeneration trigger control method according to claim 4, wherein a calculation formula of the internal mean effective pressure range $W_m$ corresponding to each position is:

$$W_m = \frac{30 * \tau * W_p}{V_s * a * n}$$

wherein a represents a number of cylinders of the engine, $V_s$ represents a cylinder volume, n represents the rotational speed range of the engine, $\tau$ represents a number of strokes of the engine, and $W_p$ represents the engine power range corresponding to the certain position.

8. The DPF regeneration trigger control method according to claim 3, wherein the probability of starting the DPF regeneration corresponding to each position is a proportion of an intersection of the exhaust temperature range corresponding to the certain position and the passive DPF regeneration required temperature range.

9. The DPF regeneration trigger control method according to claim 1, wherein the gradient of the road ahead is obtained from electronic horizon information ahead.

10. A DPF regeneration trigger control terminal device, comprising a processor, a memory, and a computer program stored in the memory and running in the processor, wherein the processor, when executing the computer program, implements the DPF regeneration trigger control method according to claim 1.

11. A non-transitory computer-readable storage medium having a computer program stored thereon, wherein the computer program, when executed by a processor, implements the DPF regeneration trigger control method according to claim 1.

* * * * *